United States Patent
Okada et al.

(10) Patent No.: US 7,720,269 B2
(45) Date of Patent: May 18, 2010

(54) VOLUMETRIC CHARACTERIZATION USING COVARIANCE ESTIMATION FROM SCALE-SPACE HESSIAN MATRICES

(75) Inventors: Kazunori Okada, Plainsboro, NJ (US); Dorin Comaniciu, Princeton Junction, NJ (US); Arun Krishnan, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1086 days.

(21) Appl. No.: 10/954,741

(22) Filed: Sep. 30, 2004

(65) Prior Publication Data

US 2005/0096525 A1  May 5, 2005

Related U.S. Application Data

(60) Provisional application No. 60/508,094, filed on Oct. 2, 2003.

(51) Int. Cl.
*G06K 9/00* (2006.01)
(52) U.S. Cl. .................. 382/131; 382/128; 382/154; 382/283; 382/286; 600/407; 600/425
(58) Field of Classification Search .......... 382/283, 382/286, 131, 154, 128; 600/407, 425
See application file for complete search history.

(56) References Cited

U.S. PATENT DOCUMENTS 5,495,540 A * 2/1996 Frankot et al. .............. 382/294

2003/0068082 A1 * 4/2003 Comaniciu et al. .......... 382/162

OTHER PUBLICATIONS

Comaniciu, Dorin: "Robust Information Fusion using Variable-Bandwidth Density Estimation", Jul. 8, 2003, vol. 2, pp. 1303-1309.*
Kanazawa, Yasushi: "Do We Really Have to Consider Covariance Matricies for Image Features", Jul. 7, 2001, vol. 2, pp. 301-306.*
Lukic et al.: "A Reversible Jump Markov Chain Monte Carlo Algorithm for Analysis of Functional Neuroimages", IEEE ICIP, 2002, p. 133-136.*
Comaniciu, "Robust information fusion using variable-bandwidth density estimation", Conference Proceedings Article, vol. 2, Jul. 8, 2003, pp. 1303-1309.
Kanazawa et al., "Do we really have to consider covariance matrices for image features?", Conference Proceedings Article, vol. 2, Jul. 7, 2001, pp. 301-306.
Comaniciu, "An Algorithm For Data-Driven Bandwidth Selection", IEEE Transactions on Pattern Analysis and Machine Intelligence, IEEE Inc., New York, vol. 25, No. 2, Feb. 2003, pp. 281-288.

* cited by examiner

*Primary Examiner*—Long V Le
*Assistant Examiner*—Ellsworth Weatherby (57) ABSTRACT

A method for determining a volume of interest in data includes determining fixed-bandwidth estimations of a plurality of analysis bandwidths, wherein the estimation of the fixed-bandwidth comprises, providing an estimate of a mode location of the volume of interest in the data, and determining a covariance of the volume of interest using a local Hessian matrix. The method further includes determining the volume of interest as a most stable fixed-bandwidth estimation across each of the plurality of analysis bandwidths.

10 Claims, 7 Drawing Sheets

VOLUMETRIC CHARACTERIZATION USING COVARIANCE ESTIMATION FROM SCALE-SPACE HESSIAN MATRICES

This application claims priority to U.S. Provisional Application Ser. No. 60/508,094, filed on Oct. 2, 2003, which is herein incorporated by reference in its entirety.

FIELD OF THE INVENTION

The present invention relates to volumetric image data characterization, and more particularly to a system and method for covariance estimation in the presence of margin-truncation for volumetric characterization.

DISCUSSION OF RELATED ART

Object detection and tracking methods have incorporated non-linear optimization techniques for determining objects in image data. The non-linear optimization methods include, for example, the Levenberg-Marquardt method and the Trust-region method. These methods locally approximate a cost function by a quadratic model defined by the Hessian, reducing the problem's complexity. Other methods have employed a series of feature detection methods using scale selection with second derivative functions have been used. In the field of medical imaging, a number of studies exploited eigen values of the Hessian for classifying local structures such as vessels. These methods did not, however, exploit the exact analytical relationship of fully parameterized covariance and Hessian in the context of robust covariance estimation.

Therefore, a need exists for a system and method for covariance estimation in the presence of margin-truncation.

SUMMARY OF THE INVENTION

According to an embodiment of the present disclosure, a method for determining a volume of interest in data includes determining fixed-bandwidth estimations of a plurality of analysis bandwidths, wherein the estimation of the fixed-bandwidth comprises, providing an estimate of a mode location of the volume of interest in the data, and determining a covariance of the volume of interest using a local Hessian matrix. The method further includes determining the volume of interest as a most stable fixed-bandwidth estimation across each of the plurality of analysis bandwidths.

The estimate of the mode location is provided manually. Providing the estimate of the mode location comprises determining a mean shift estimation of the volume of interest within each analysis bandwidth.

Determining the covariance further includes determining a scale-space representation at the mode location, determining a scale-space Hessian at the mode location, and determining the covariance of the volume of interest from the scale-space Hessian. The covariance is determined based on a truncated Gaussian fitted to the volume of interest, the truncated Gaussian comprising a plurality of arbitrarily missing tails.

The data is volumetric image data. The volume of interest is determined as a confidence ellipsoid of the fitted Gaussian in the data.

According to an embodiment of the present disclosure, a program storage device readable by machine, tangibly embodying a program of instructions executable by the machine to perform method steps for determining a volume of interest in data. The method includes determining fixed-bandwidth estimations of a plurality of analysis bandwidths, wherein the estimation of the fixed-bandwidth comprises, providing an estimate of a mode location of the volume of interest in the data, and determining a covariance of the volume of interest using a local Hessian matrix. The method further includes determining the volume of interest as a most stable fixed-bandwidth estimation across each of the plurality of analysis bandwidths.

According to an embodiment of the present disclosure, a method for determining a covariance of a volume of interest includes determining a scale-space representation at a given mode location, determining a scale-space Hessian at the given mode location, and determining the covariance of the volume of interest from the scale-space Hessian, wherein the covariance defines a spread of the volume of interest. The covariance is determined based on a truncated Gaussian fitted to the volume of interest, the truncated Gaussian comprising a plurality of arbitrarily missing tails.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

According to an embodiment of the present disclosure, a method for characterizing anisotropic spread and orientation of local structures in a d-variate multi-modal non-negative function evaluated in continuous scale-space utilizes a class of blob-like structures that can be locally approximated by a Gaussian-based model. Such blob-like structures appear frequently in practical situations and represent significant objects of interest such as tumors in volumetric medial images and storm locations in radar data to name a few. According to an embodiment of the present disclosure, the mean vector and the covariance matrix of a Gaussian function represents the center-location and the anisotropic spread of the blob-like structure, respectively. Therefore, the covariance estimation with Gaussian model that best fits given local structures provides a direct means for characterization the spread of the local structures.

One difficulty in this scenario is the problem of margin-truncations induced by nearby structures. Margin-truncation may arise when multiple structures are clustered tightly in a data space so that surrounding structures impose estimation bias for the targeted structure. To avoid such bias, a truncated Gaussian whose tails are arbitrarily missing needs to be fitted to the targeted structure.

Figure 1:
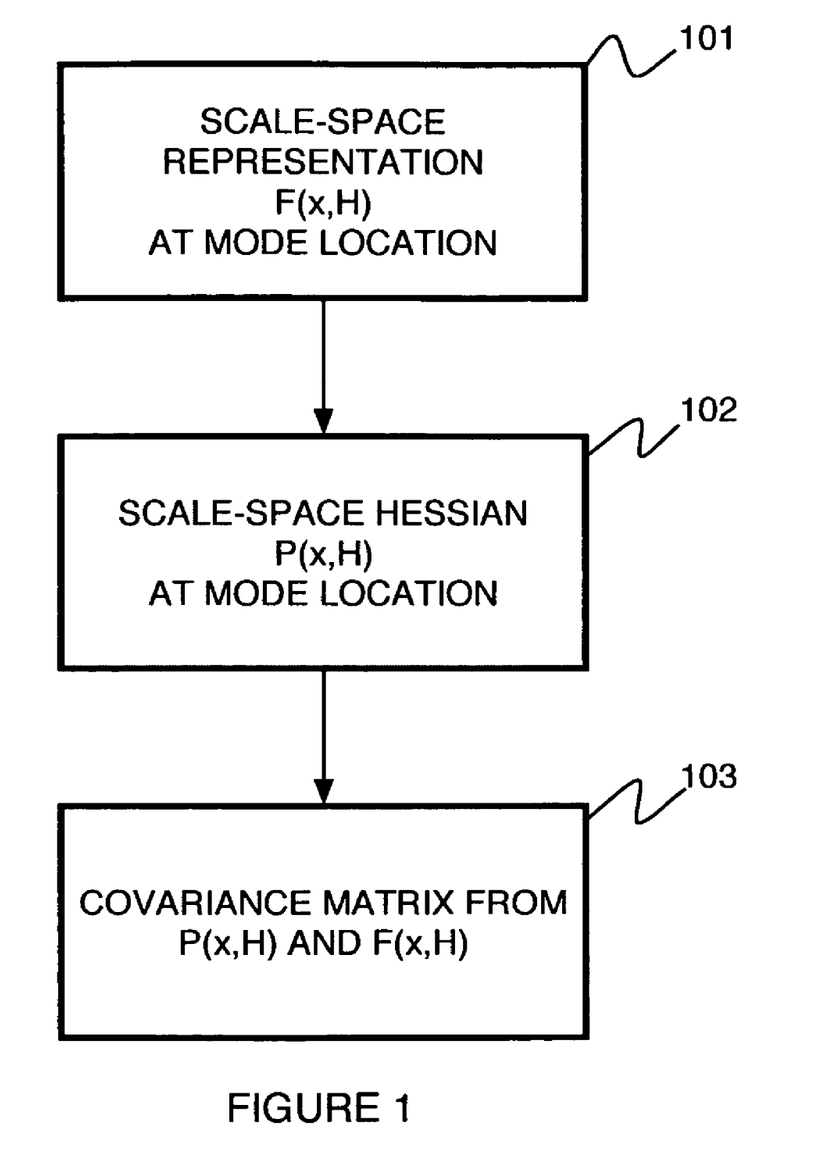
FIG. 1 is a flow chart illustrating a method for determining a covariance estimation according to an embodiment of the present disclosure.

According to an embodiment of the present disclosure, the margin-truncation problem is resolved by inducing semi-global spread (covariance) information from local curvature (Hessian) information measured at a mode location. Referring to FIG. 1, a closed-form analytical formula of the covariance matrix 103 has been derived as a function of the Hessian matrix 102 determined at a mode location within a scale-space representation 101. Since the Hessian captures only local information in the proximity of the mode, the truncation will not cause the estimation bias in the Hessian. Thus, the covariance directly induced from Hessian should not suffer from the truncation problem.

A robust estimation method is employed based on a continuous scale-space theory to cope with sensitivity to noises in signals and errors in mode estimates 102. Resulting multi-scale analysis framework relates the covariance to the scale-space Hessian 103, a Hessian matrix determined with a signal evaluated in the continuous scale-space. The Hessian realizes robust association between the accurate global spreads and the noise-sensitive curvatures 104. Using a Hessian matrix according to an embodiment of the present disclosure, the robustness of the covariance estimation is improved in the presence of the margin-truncation. Preliminary studies have been conducted to evaluate a method according to an embodiment of the present disclosure.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 2:
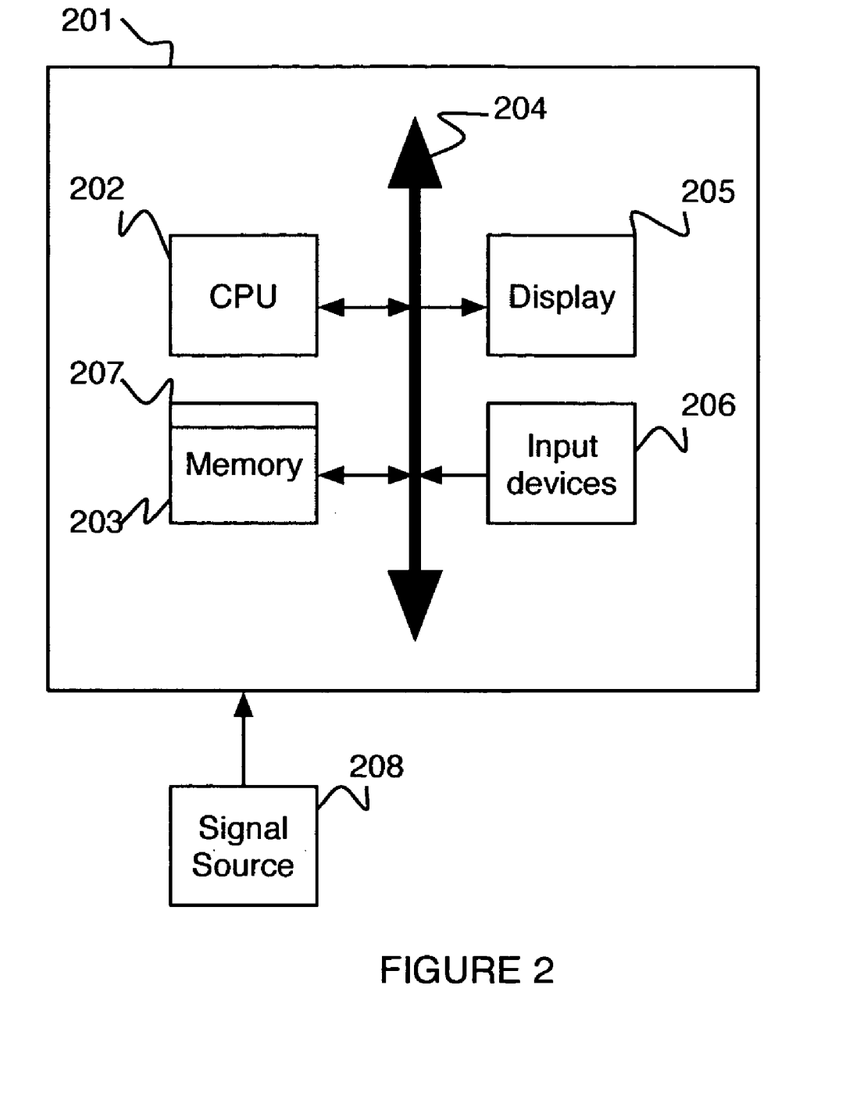
FIG. 2 is an illustration of a system according to an embodiment of the present disclosure.

Referring to FIG. 2, according to an embodiment of the present disclosure, a computer system 201 for determining volume of interest using a covariance estimation in the presence of margin-truncation can comprise, inter alia, a central processing unit (CPU) 202, a memory 203 and an input/output (I/O) interface 204. The computer system 201 is generally coupled through the I/O interface 204 to a display 205 and various input devices 206 such as a mouse and keyboard. The support circuits can include circuits such as cache, power supplies, clock circuits, and a communications bus. The memory 203 can include random access memory (RAM), read only memory (ROM), disk drive, tape drive, etc., or a combination thereof. The present invention can be implemented as a routine 207 that is stored in memory 203 and executed by the CPU 202 to process the signal from the signal source 208, such as a CT scanner. As such, the computer system 201 is a general-purpose computer system that becomes a specific purpose computer system when executing the routine 207 of the present invention.

The computer platform 201 also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

From FIG. 1, the covariance estimation from scale-space Hessian derives from a closed-form formula of the covariance matrix of a Gaussian-based model induced directly from a scale-space Hessian matrix measured at the mode location.

Suppose a d-dimensional multi-modal continuous non-negative function f(x) represents an image signal of interest: using the symbol u for describing one of the spatial extrema of f in the sense of image analysis or modes in the sense of density estimation. Suppose that the local region of f around u can be approximated by a product of a d-variate Gaussian function and a positive multiplicative parameter, $$f(x) \simeq \alpha \times \Phi(x; u, \Sigma)|_{x \in s}, \quad (1)$$

$$\Phi(x; u, \Sigma) = (2\pi)^{-d/2}|\Sigma|^{-1/2}\exp\left(-\frac{1}{2}(x-u)^t\Sigma^{-1}(x-u)\right), \quad (2)$$

where S is a set of data points which belong to the neighborhood u and whose function values are consistent with the structural characteristics of the local data. In practical scenarios this is a reasonable approximation, given an appropriate definition of S. The problem of interest can now be understood as the parametric model fitting and the estimation of the model parameters: mean u, covariance $\Sigma$, and amplitude $\alpha$.

Referring to FIG. 1, box 101, the scale-space theory states that, given a d-dimensional continuous signal $f:R^d \to R$, the scale-space representation $F:R_d \times R_+ \to R$ of f, is the unique solution to the diffusion equation, $\partial_h F = \frac{1}{2}\nabla^2 F$, or equivalently the convolution of the signal with d-variate Gaussian kernels $\Phi(x;0,H)$ with various analysis bandwidth (or scale) matrix $H \in R^{d \times d}$, $$F(x;H) = f(x) * \Phi(x;0,H). \quad (3)$$

Referring to FIG. 1, box 102, a scale-space Hessian matrix is defined as d×d Hessian matrix of F(H) at x, which will be indicated by the symbol P. The Hessian can be written as convolution of f with the second-order derivatives of Gaussian kernel $(\nabla\nabla^t)\Phi$, since differential operators commute across convolution operations, $$P(x; H) \equiv (\nabla\nabla^t)F(x; H) \quad (4)$$
$$= f(x) * (\nabla\nabla^t)\Phi(x; H)$$
$$= f(x) * \Phi(x; H)H^{-1}(xx^t - H)H^{-1}.$$

Eq. (4) provides a means for determining the scale-space Hessian directly from the signal f.

Referring to FIG. 1, box 103, a closed-form formula of the Gaussian covariance is derived as a function of the scale-space Hessian determined at a mode. By substituting Eq. (1) to Eq. (3) and Eq. (4), analytical formula of F and P are given as a function of a Gaussian with enlarged covariance $\Sigma+H$, $$F(x;H) = \alpha \times \Phi(x;u,\Sigma+H), \quad (5)$$

$$P(x;H) = \alpha \times \Phi(x;u,\Sigma+H) \times (\Sigma+H)^{-1}[(u-x)(u-x)^t - (\Sigma+H)](\Sigma+H)^{-1} \quad (6)$$

Eq. (5) and Eq. (6) collapse into the following forms without the exponential when evaluated at the mode location u, $$F(u;H) = \alpha(2\pi)^{-d/2}|\Sigma+H|^{-1/2} \quad (7)$$

$$P(u;H) = -\alpha(2\pi)^{-d/2}|\Sigma+H|^{-1/2}(\Sigma+H)^{-1} \quad (8)$$

Eq. (8) expresses the relationship of the scale-space Hessian matrix P(u;H) and the covariance matrix Σ of the Gaussian model that locally approximates the function f around u. Recall that P(u;H) can be determined directly from the signal f(x) using Eq. (4). Therefore, transforming Eq. (8) to the form of Σ=g(P) will provide a direct formula of interest. The following analytically derives such function g. Considering a symmetric Schur decomposition of Σ+H and P, $$\Sigma + H = U\Lambda U^t, \quad (9)$$

$$P = V\Gamma V^t,$$

$$UU^t = VV^t = I. \quad (10)$$

By definition, Σ and H are confined to be symmetric positive definite. P is symmetric negative definite if the mode u is at a stable critical point of −f. Eq. (8) holds when the mode u is at a peak F, not on a saddle point. When P is numerically measured from f, assurances are needed that u satisfies the condition and equivalently that P is negative definite. When these conditions meet, Λ and Γ are diagonal matrices with positive and negative components, respectively. And the orthogonal based U and V become equivalent.

Next, Λ is determined as a function of Γ. Substituting the decompositions Eq. (9) and Eq. (10) into Eq. (8) and assuming U=V yields $$\Gamma = -|\alpha^{-2/d} 2\pi\Lambda|^{-1/2}\Lambda^{-1}.$$

Manipulating this equation while maintaining the equality provides, $$\Lambda = \alpha^{\frac{2}{d+2}}|2\pi(-\Gamma)^{-1}|^{-\frac{1}{d+2}}(-\Gamma)^{-1} \quad (11)$$

Combined Eq. (11) with the decompositions Eq. (9) and Eq. (10) results in, $$\Sigma + H = U\left[\alpha^{\frac{2}{d+2}}|2\pi(-\Gamma)^{-1}|^{-\frac{1}{d+2}}(-\Gamma)^{-1}\right]U^t \quad (12)$$

$$= \alpha^{\frac{2}{d+2}}|2\pi(-V\Gamma V^t)^{-1}|^{-\frac{1}{d+2}}(-V\Gamma V^t)^{-1}$$

$$= \alpha^{\frac{2}{d+2}}|2\pi(-P)^{-1}|^{-\frac{1}{d+2}}(-P)^{-1}$$

$$\Leftrightarrow \Sigma = \alpha^{\frac{2}{d+2}}|2\pi(-P)^{-1}|^{-\frac{1}{d+2}}(-P)^{-1} - H$$

Eq. (12) yields a desirable form of the formula, however it is cumbersome to have the multiplicative factor α as a free parameter to be estimated. The margin-truncation problem also makes direct estimation of an α difficult. Addressing this issue, a solution has been determined that vanishes α. Rewriting Eq. (12) as follows, $$\Sigma + H = \alpha^{\frac{2}{d+2}}Q, \quad (13)$$

$$Q = |2\pi(-P)^{-1}|^{-\frac{1}{d+2}}(-P)^{-1}. \quad (14)$$

where Q is a matrix function that depends only on the scale space Hessian matrix P. Substituting this to Eq. (7) yields, $$F(u; H) = \alpha(2\pi)^{-d/2}\left|\alpha^{\frac{2}{d+2}}Q\right|^{-1/2} \quad (15)$$

$$= \alpha^{\frac{2}{d+2}}(2\pi)^{-d/2}|Q|^{-1/2}$$

$$\Leftrightarrow \alpha^{\frac{2}{d+2}} = (2\pi)^{d/2}|Q|^{1/2}F(u; H)$$

It can be seen that α is vanished from Eq. (12) by substituting Eq. (15), $$\Sigma = (2\pi)^{d/2}F(u; H)|Q|^{1/2}Q - H \quad (16)$$

$$Q = |2\pi(-P(u; H))^{-1}|^{-\frac{1}{d+2}}(-P(u; H))^{-1}.$$

Note that F(u;H) can be numerically computed from the signal f using Eq. (3) without imposing much computational burden similar to the case for P. Thus, Eq. (16) gives a result.

Figure 3:
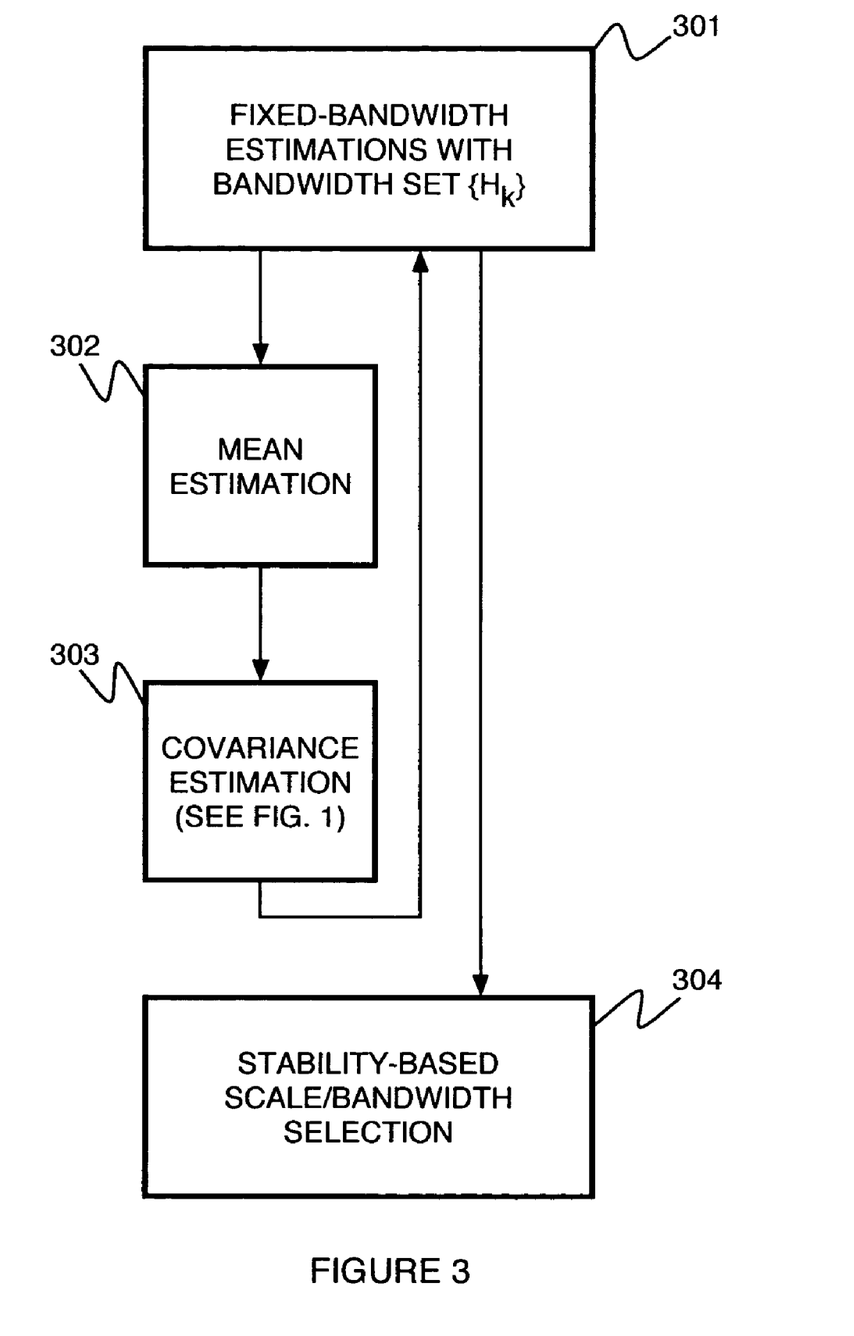
FIG. 3 is a flow chart illustrating a method for determining an estimation of volumetric characterization according to an embodiment of the present disclosure.

Referring to FIG. 3, the multi-scale analysis includes a mode estimation for the scale-space representation. The above framework assumes that the mode locations, e.g., locations of tumors in medial image data, are given by another means, for example, provided manually by a radiologist. Robust mode seeking methods based on the mean shift procedure 302 may be employed prior to the covariance estimation 303. A sampling method, including mode and covariance estimates, may be used given a rough initial estimate of u and a variable-bandwidth mean shift procedure without such information. Both methods, the mode seeking methods and sampling method, exploit an extended mean shift for the continuous function of interest, $$\nabla F(x; H) = f(x) * \nabla \Phi(x; H) = H^{-1}F(x; H)m(x; H), \quad (17)$$

$$m(x; H) \equiv \frac{\int x'\Phi(x-x'; H)f(x')dx'}{\int \Phi(x-x'; H)f(x')dx'} - x. \quad (18)$$

Eq. (18) gives the extended fixed-bandwidth mean shift vector for f. The mean shift procedure 302 is defined as iterative updates of a data point $x_i$ until convergence; $y_{j+1} = m(y_j; H) + y_j$ given $y_0 = x_i$. The convergence point $y^m$ from a number of starting points defines a mode estimate $u_k$ in F(H). The set S, describing the neighborhood of the estimate $u_k$, is given by combining all data points that converge into the same mode. The mode is a center location for the volume of interest, e.g. a tumor.

The D-dimensional spread and orientation of the volume of interest whose center location as a spatial extremum is estimated (see FIG. 1). Such geometrical information of D-dimensional local surfaces can be characterized by a covariance matrix estimated at the extrema.

Turning now to the scale selection criterion, the multi-scale analysis treats H, analysis bandwidth, as a variable parameter. It supposes a set of analysis bandwidth $H_1, \ldots, H_K$ is given a priori. The estimation is performed independently for each bandwidth $H_k$ 301. The bandwidth that provides the optimal among K estimates is sought by a certain criterion. A stability test can be used as a scale selection criterion. Given a set of estimates $\{(u_k, \Sigma_k)\}$, a form of the Jensen-Shannon divergence (JS(k)) is defined by, $$JS(k) = \frac{1}{2}\log\frac{\left|\frac{1}{2a+1}\sum_{j=k-a}^{k+a}\Sigma_j\right|}{2a+1\sqrt{\prod_{j=k-a}^{k+a}|\Sigma_j|}} + \frac{1}{2}\sum_{j=k-a}^{k+a}(u_j - u)^t\left(\sum_{j=k-a}^{k+a}\Sigma_j\right)^{-1}(u_j - u)$$

(19)

where $$u = \frac{1}{2a+1}\sum_{k-a}^{k+a} u_j$$

and $\alpha$ is a neighborhood parameter. Note that the form of this divergence measurement for two adjacent scales reduces to the Bhattacharyya distance. The most stable estimate across the analysis bandwidth provides a local minimum of the divergence profile. Such an estimate may be treated as a final estimation of the multi-scale analysis 304. The final estimate defines a volume in the scale-space determined to be an object of interest, such as a tumor in medical image data.

Figure 4A:
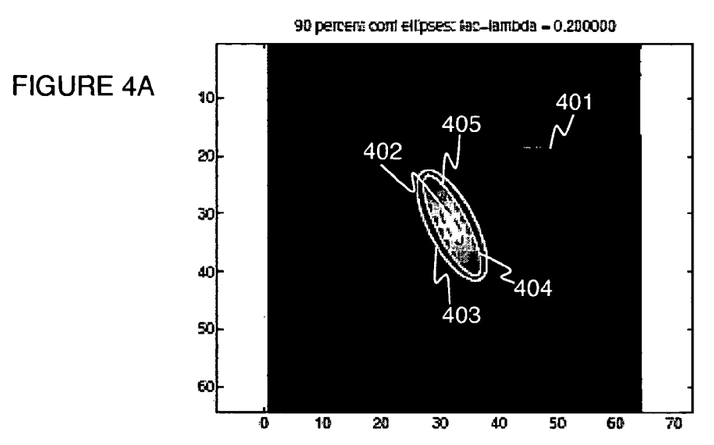
FIGS. 4A-F are images of covariance estimates of two-dimensional synthetic Gaussian according to an embodiment of the present disclosure.
Figure 4B:
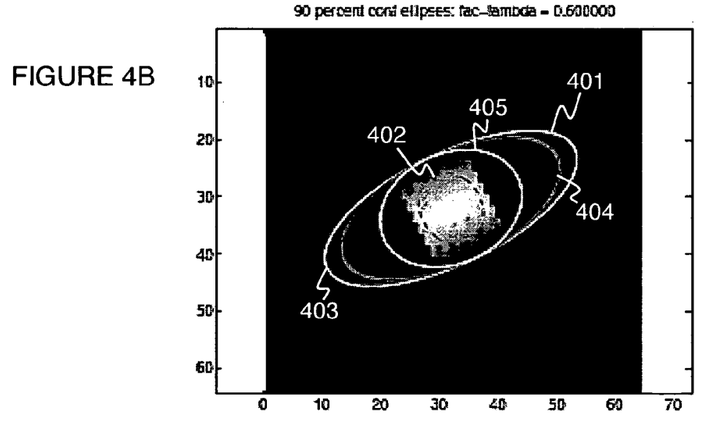
Figure 4C:
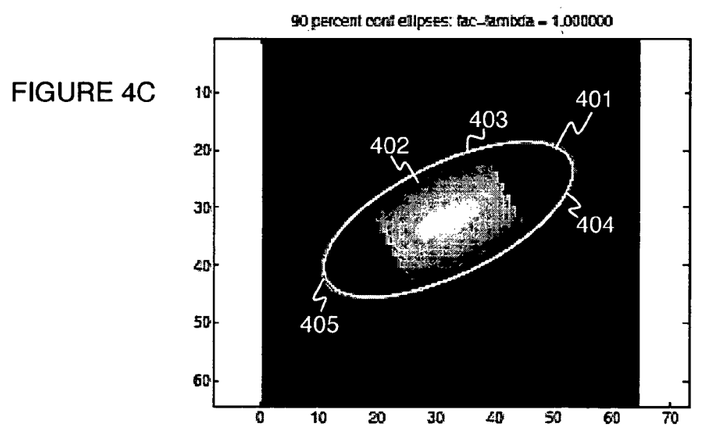
Figure 4D:
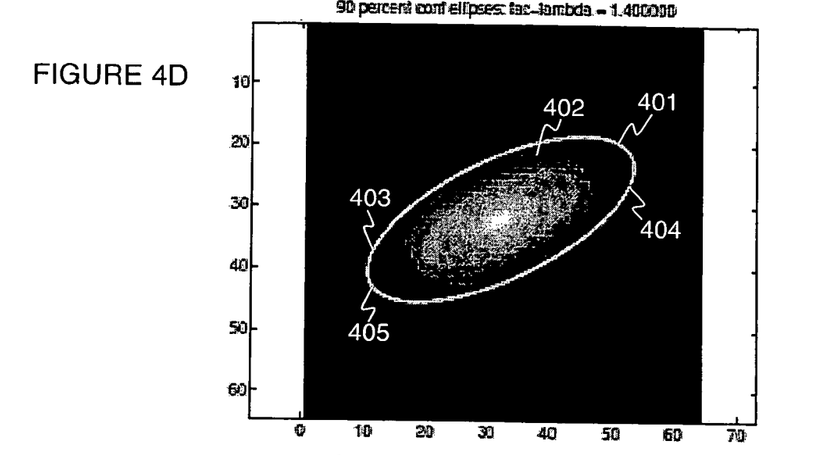
Figure 4E:
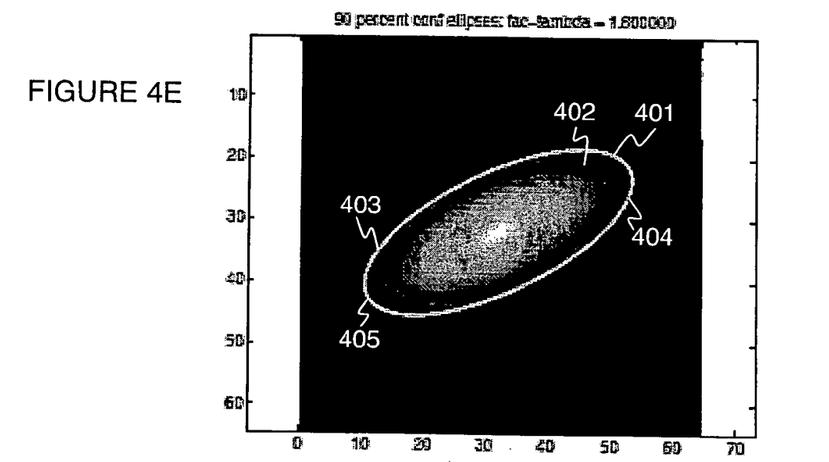
Figure 4F:
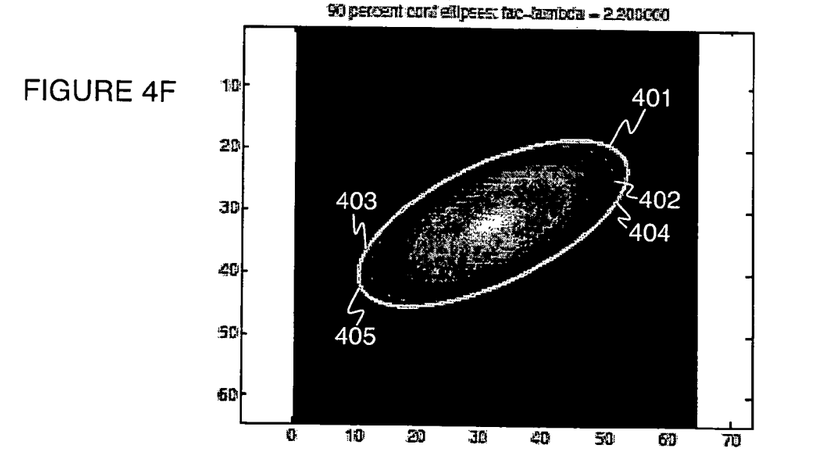
Figure 5:
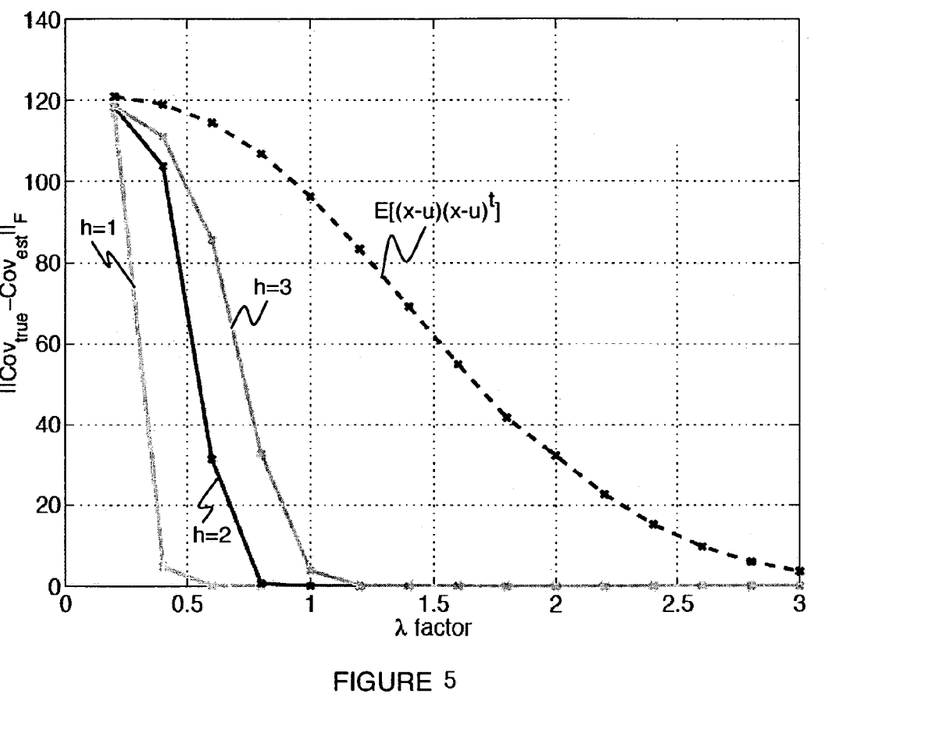
FIG. 5 is a graph depicting errors of various covariance estimates with respect to a ground-truth in terms of Frobenius norm according to an embodiment of the present disclosure.
Figure 6A:
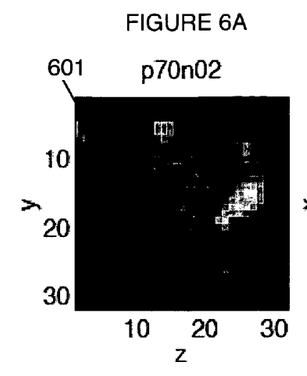
FIGS. 6A-6F illustrate and example of a three-dimensional location, spread and orientation estimation according to an embodiment of the present disclosure.
Figure 6B:
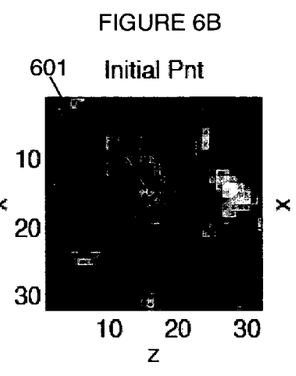
Figure 6C:
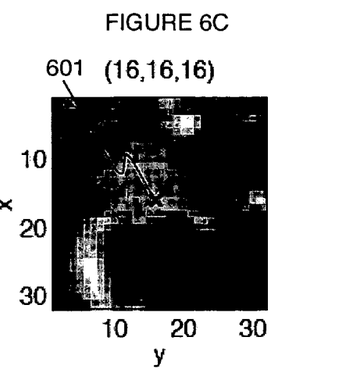
Figure 6D:
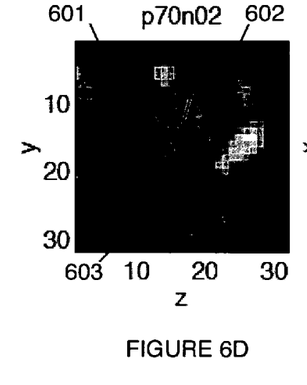
Figure 6E:
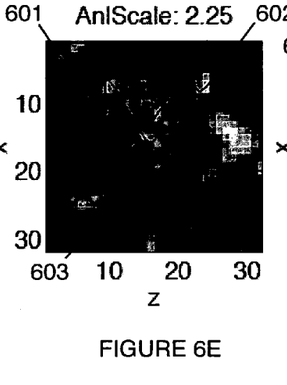
Figure 6F:
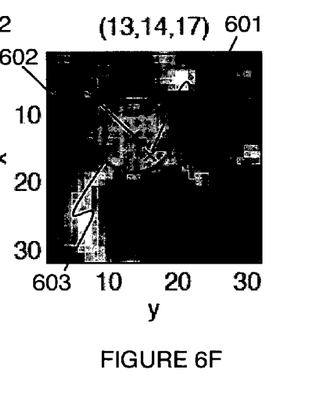

Experimental data has been gathered using an embodiment of the present disclosure. A two-dimensional (2D) implementation of an embodiment of the present disclosure is evaluated with a 2D synthetic Gaussian data. In order to investigate its robustness against the margin-truncation problem, test data was symmetrically truncated at its tails along the main axis. The covariance estimates achieved were compared with those by the standard sample estimation method. The covariance estimates were derived for three analysis bandwidth h=1,2,3 where H=hI. The sample estimate is given with the marginal density directly computed form f normalized by the total probability mass. FIGS. 4A-4F illustrate various covariance estimates of a 2D synthetic Gaussian with the ground-truth covariance [40 −40;40 100] and $\alpha$=10. The extent of the truncation is quantified by a factor to the main eigen value $\lambda$ of the ground-truth covariance. FIG. 4A: 0.2$\lambda$, FIG. 4B: 0.6$\lambda$, FIG. 4C: 1.0$\lambda$, FIG. 4D: 1.4$\lambda$, FIG. 4E: 1.8$\lambda$, FIG. 4F: 2.2$\lambda$. Each estimate is shown as a 90% confidence ellipse. The results, and in particular FIGS. 4B and 4C have shown clear advantage of a method according to an embodiment of the present disclosure against the sample estimation. In FIGS. 4A-4F, where estimates overlap, a signal line in the figure may be designated with multiple labels. The ground truth is designated 401 and the sample estimate is designated 402. h=1, h=2 and h=3 are designated 403, 404 and 405 respectively. The result was substantially identical when the amplitude parameter $\alpha$ was changed. Also, similar results were obtained when the data was truncated asymmetrically and isotropically. FIG. 5 shows errors of the various covariance estimates with respect to the ground-truth in terms of Frobenius norm. These errors are plotted against the truncation extent quantified by a factor to the margin eigen value $\lambda$ of the ground-truth covariance.

A three-dimensional (3D) implementation of the covariance estimation according to an embodiment of the present disclosure is incorporated to the multi-scale analysis framework. The implementation was evaluated with the high-resolution computed-tomography (HRCT) images showing lung tumors. Beyond the margin-truncation problem, these data impose the non-Gaussianity effect, with which the data signal deviates largely from the used Gaussian model. Clinically it has been shown that the non- and part-solid nodules, showing high non-Gaussianity, have a higher chance of becoming malignant over time. Thus, it is important that any solution is also robust against this effect. FIGS. 6A-6F illustrate an example of the 3D analysis results with a part-solid nodule. The correct tumor center and spread estimate indicates robustness against both margin-truncation and non-Gaussianity effects. The cross 601 indicates a rough initial estimate of u. The cross 602 and ellipse 603 indicate the location and spread estimates. Having a determined location and spread of a volume of interest, where the volume is a tumor may allow for more precise diagnosis, analysis, and treatment (e.g., aiding the complete removal of the tumor while minimizing removal or damage to surrounding tissue given knowledge of the tumor spread). While examples, have been given related to determining a tumor, the examples are not intended to be limiting. Embodiments of the present disclosure may be applied to other areas, including for example, storm analysis, and astronomy. For applications related to determining a location and spread of a storm, more precise modeling of storm tracking and damage estimates may be gleamed.

Having described embodiments for a system and method for covariance estimation in the presence of margin-truncation, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A computer-implemented method for determining a volume of interest in data comprising:

determining, by a processor, fixed-bandwidth estimations of a plurality of analysis bandwidths, wherein the estimation of the fixed-bandwidth comprises, providing an estimate of a mode location of the volume of interest in the data, and determining a covariance of the volume of interest using a local Hessian matrix, comprising determining a scale-space representation of the volume of interest;

determining a scale-space Hessian of the volume of interest at the mode location given the scale-space representation; and determining the covariance of the volume of interest from the scale-space Hessian, wherein the covariance defines a boundary of the volume of interest around the mode location, wherein the covariance is determined based on a truncated Gaussian fitted to the volume of interest, the truncated Gaussian comprising a plurality of arbitrarily missing tails; and determining, by the processor, the volume of interest as a most stable fixed-bandwidth estimation across each of the plurality of analysis bandwidths.

2. The method of claim 1, wherein the estimate of the mode location is provided manually.

3. The method of claim 1 wherein providing the estimate of the mode location comprises determining a mean shift estimation of the volume of interest within each analysis bandwidth.

4. The method of claim 1, wherein the data is volumetric image data.

5. The method of claim 4, wherein the volume of interest is determined as a confidence ellipsoid of a fitted Gaussian in the data.

6. A non-transitory computer readable medium embodying a program of instructions executed by a processor to perform method steps for determining a volume of interest in data, the method comprising:
   determining fixed-bandwidth estimations of a plurality of analysis bandwidths, wherein the estimation of the fixed-bandwidth comprises,
      providing an estimate of a mode location of the volume of interest in the data, and
      determining a covariance of the volume of interest using a local Hessian matrix comprising
         determining a scale-space representation of the volume of interest;
         determining a scale-space Hessian of the volume of interest at the mode location given the scale-space representation; and
         determining the covariance of the volume of interest from the scale-space Hessian, wherein the covariance defines a boundary of the volume of interest around the mode location, wherein the covariance is determined based on a truncated Gaussian fitted to the volume of interest, the truncated Gaussian comprising a plurality of arbitrarily missing tails; and
   determining the volume of interest as a most stable fixed-bandwidth estimation across each of the plurality of analysis bandwidths.

7. The computer readable medium of claim 6, wherein the estimate of the mode is provided manually.

8. The computer readable medium of claim 6, wherein providing the estimate of the mode comprises determining a mean shift estimation of the volume of interest within each analysis bandwidth.

9. The computer readable medium of claim 6, wherein the data is volumetric image data.

10. The computer readable medium of claim 9, wherein the volume of interest is determined as a confidence ellipsoid of a fitted Gaussian in the data.

* * * * *